Patented May 12, 1953

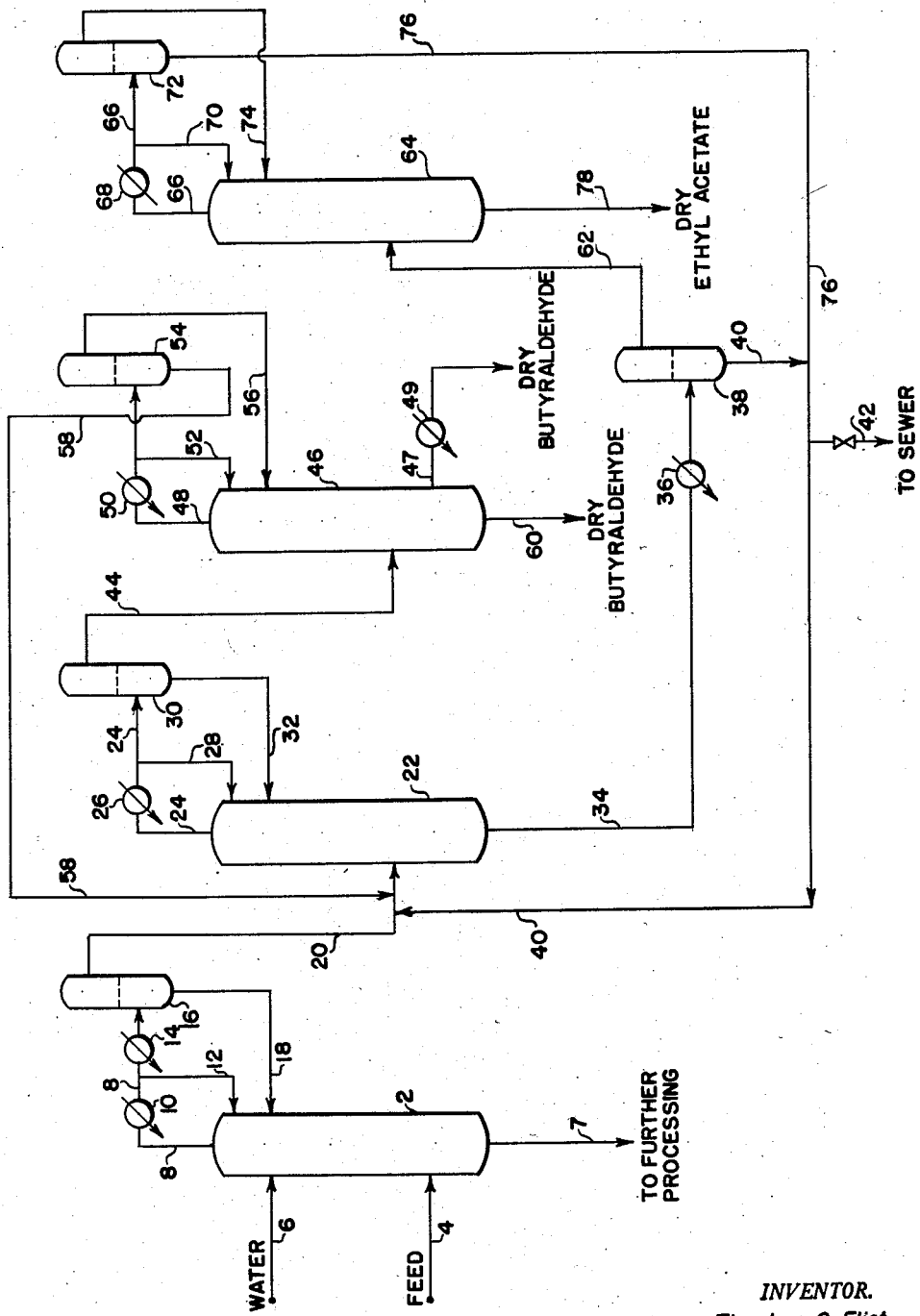

2,638,442

UNITED STATES PATENT OFFICE 2,638,442

DISTILLATION PROCESS FOR SEPARATING BUTYRALDEHYDE FROM ETHYL ACETATE

Theodore Q. Eliot, Tulsa, Okla., assignor to Stanolind Oil and Gas Company, Tulsa, Okla., a corporation of Delaware Application October 20, 1949, Serial No. 122,524

6 Claims. (Cl. 202—39.5)

The present invention relates to an improved process for the separation of butyraldehyde from ethyl acetate. More particularly, it pertains to a method for separating mixtures of these materials by subjecting the latter to distillation in the presence of water under reduced pressure.

The separation of butyraldehyde from ethyl acetate has always presented an extremely difficult problem. The pure compounds either when dry or when in the presence of sufficient water to form their respective azeotropes boil only 2.4° C. (760 mm.) apart. While the problem of separating butyraldehyde from ethyl acetate occurs in numerous purification processes, one of the principal instances where an efficient method for the separation of these two chemicals is most urgently needed is in their recovery, along with other chemicals, from the aqueous fraction produced by the reduction of carbon monoxide with hydrogen under known synthesis conditions. The magnitude of this problem may be more fully appreciated when it is realized that in hydrocarbon synthesis plants designed for commercial operation and having a capacity in the neighborhood of 5,000 to 6,000 bbls. per day of liquid hydrocarbons, there are produced approximately 6900 lbs. per day of butyraldehyde and 2300 lbs. per day of ethyl acetate. Specifically, the mixtures of butyraldehyde and ethyl acetate thus obtained usually contain from about 50 to 75 weight per cent butyraldehyde, 20 to 40 weight per cent ethyl acetate, and from about 3 to about 7 weight per cent water. Distillation of such a mixture is ineffective to separate these two chemicals owing to the fact that their individual aqueous azeotropes as well as the individual pure compounds boil only 2.4° C. apart, as noted above.

Accordingly, it is an object of my invention to provide a method whereby butyraldehyde can be obtained in substantially anhydrous form and substantially free from objectionable amounts of ethyl acetate by distillation of mixtures of these compounds in the presence of water at subatmospheric pressures, for example, from about 50 to about 250 mm. It is a further object of my invention to remove solubilized water from the wet butyraldehyde and ethyl acetate thus separated by first allowing these mixtures to collect in individual settling tanks and thereafter subjecting the resulting product layers to distillation to obtain in one case an overhead of butyraldehyde-water azeotrope and a dry butyraldehyde residue and in the other case an overhead of ethyl acetate-water azeotrope and a dry ethyl acetate bottoms portion.

The above and other objects of my invention are effected by employing a system of the type shown in the accompanying drawing wherein a charging stock, for example, comprising essentially an aqueous solution of butyraldehyde, ethyl acetate, methyl ethyl ketone, methyl propyl ketone, isopropyl alcohol, and ethanol, obtained by the hydrogenation of carbon monoxide in the presence of a fluidized iron catalyst, is introduced into column 2 through line 4. In this column the feed is subjected to an extractive distillation operation by the introduction of water at a point near the top of the column through line 6 where the hot rising vapors of the feed mixture are contacted by the descending water stream. Generally, to effect a satisfactory separation of butyraldehyde and ethyl acetate from methyl ethyl ketone, methyl propyl ketone, isopropyl alcohol, and ethanol at this point, the dilution water added through line 6 should be introduced in an amount such that the concentration of water in the liquid at any point in the column is from about 90 to 99 mole per cent and preferably about 95 mole per cent. The amount of net overhead withdrawn should be carefully controlled to avoid forcing methyl ethyl ketone, methyl propyl ketone, ethanol, or isopropyl alcohol overhead or butyraldehyde and ethyl acetate into the bottoms at this stage. Ordinarily, the heat input should be in the range of 80 to 120 B. t. u. per lb. of bottoms, preferably about 90 B. t. u. per lb. of bottoms. It has been my observation, however, that the use of an excessive amount of heat impairs the efficiency of the column since, under such conditions, the concentration of water in the column falls below the value suitable for effecting the desired separation. The temperature employed in carrying out this operation may vary; however, I may generally employ bottom tower temperatures of from about 82° to about 94° C. (corrected to atmospheric pressure), preferably about 85° C., and top tower temperatures of from about 68° to about 77° C., preferably 71° C. The bottoms stream which consists of an aqueous solution of methyl ethyl ketone, methyl propyl ketone, ethanol, and isopropyl alcohol is withdrawn through line 7 and the chemicals contained therein recovered and purified in accordance with procedures outside the scope of this invention.

The overhead stream, consisting essentially of butyraldehyde, ethyl acetate, and water in azeotropic proportions, is withdrawn through line 8 and condenser 10 and partially recycled as reflux through line 12. The remainder of the overhead stream is sent through line 8 into cooler 14 where it is chilled after which it is passed into separator 16 and allowed to stratify into two layers, the upper one of which consists of butyraldehyde and ethyl acetate together with some solubilized water. The lower water layer contains a small amount of solubilized ethyl acetate and butyraldehyde and is returned to column 2 through line 18. The organic layer which, under these circumstances, consists of about 72 weight per cent butyraldehyde, 24 weight per cent ethyl acetate, and 4 weight per cent water, is then sent through line 20 where it is mixed with additional water from lines 40 and 58 and thereafter introduced into column 22. Since the organic layer withdrawn from separator 16 through line 20 is already saturated with respect to water, it will be apparent that the addition of water thereto through lines 40 and 58 will produce a heterogeneous aqueous mixture of butyraldehyde and ethyl acetate prior to the distillation step carried out in column 22. The formation of a heterogeneous mixture at this point is desired in the operation of my process and the amount of water introduced into line 20 via lines 40 and 58 should be at least enough so that the individual aqueous azeotropes of butyraldehyde and ethyl acetate can be formed but should not be more than about 50 per cent based on the weight of chemicals charged to column 22. Expressed otherwise, the water content of the feed stock charged to column 22 should generally be in the range of from about 9 to about 35 weight per cent.

The feed introduced into column 22 is then subjected to fractional distillation under reduced pressure to withdraw a wet overhead of butyraldehyde through line 24 and condenser 26, a portion thereof being returned to the column through line 28 as reflux. In this connection, the reflux ratio maintained in column 22 should generally be in the range of from about 5:1 to about 15:1. The balance of the overhead stream is conducted through line 24 to separator 30 where the resulting distillate separates into two layers; the lower water layer being returned through line 32 to column 22. The bottoms obtained in this distillation operation consists essentially of ethyl acetate together with water in at least azeotropic amounts and is withdrawn through line 34 and cooler 36 after which it is introduced into separator 38. The water layer thus formed is returned to column 22 via lines 40 and 20. Periodically, water may be purged from the system through valved line 42. In column 22 the conditions necessary to effect the desired separation of butyraldehyde from ethyl acetate may vary rather widely. Thus, in the top of the column, the pressure may range from about 50 to about 250 mm., preferably about 150 mm., and the temperature may range from about 2° to about 35° or 40° C., preferably about 25° C. Bottom pressures and temperatures should generally be maintained in a range of from about 200 to about 400 mm., preferably about 250 mm., and from about 38° to about 65° C., preferably about 52° C., respectively.

The organic layer in separator 30 which consists essentially of butyraldehyde, together with about 3.5 weight per cent of water, is withdrawn through line 44 and introduced into column 46 which is operated at atmospheric pressure or above to increase the efficiency of the butyraldehyde drying operation. At atmospheric pressure the butyraldehyde-water azeotrope contains 12 weight per cent water and within limits the quantity of azeotropic water may be increased by increasing the pressure. Excessive pressures are to be avoided since the temperatures necessary to vaporize the feed at such pressures causes polymerization of the butyraldehyde. In the majority of instances, however, I prefer to employ pressures up to about 40 p. s. i. a. In this distillation, an overhead of butyraldehyde-water azeotrope is withdrawn through line 48 and condenser 50, a portion thereof being returned to the column as reflux through line 52. The major portion of the overhead stream passes into separator 54 where the organic layer of wet butyraldehyde (contains about 3.5 weight per cent water) is returned through line 56 to column 46 for elimination of water. The water layer in separator 54 is returned to column 22 via lines 58 and 20 and a dry butyraldehyde bottoms of approximately 94 to 99 weight per cent purity is withdrawn from column 46 through line 60. Alternatively, butyraldehyde may be removed from column 46 in vapor form through a side draw-off line 47 and converted to liquid in condenser 49. The butyraldehyde obtained in this manner is normally entirely free from polymeric products. In the event butyraldehyde is recovered from column 46 in this manner, line 60 may be used as a purge line to prevent the concentration of undesirable impurities from building up in the system. The organic layer in separator 38, which consists of wet ethyl acetate (contains about 3.8 weight per cent water) is withdrawn through line 62 and introduced into column 64 operated at atmospheric pressure or above, for example, up to about 50 p. s. i. a. The overhead fraction obtained in this operation consists of the ethyl acetate-water azeotrope and is withdrawn through line 66 and condenser 68, part of which is returned to the column through line 70 as reflux. The organic layer in separator 72, consisting of ethyl acetate together with about 3.3 weight per cent water, is returned to the column through line 74 where the remaining water is rejected. The lower water layer in separator 72 is withdrawn through line 76 and combined with the water in line 40. A dry ethyl acetate bottoms of about 97 weight per cent purity is withdrawn from column 64 through line 78. In this drying operation the pressure within the distillation column is preferably at least equal to atmospheric pressure. From theoretical considerations, it is indicated that increased drying efficiency is achieved with increased pressures; however, for practical reasons I have found that adequate drying can be accomplished at pressures not substantially in excess of 50 p. s. i. a.

One of the outstanding and surprising features of my invention resides in the separation of butyraldehyde from ethyl acetate by vacuum distillation of mixtures thereof in the presence of water, notwithstanding the fact that I have been unable to accomplish this object either by dry vacuum distillation or by means of wet distillation of such mixtures at atmospheric or higher pressures. This fact is even more surprising inasmuch as the vapor pressure curves for butyraldehyde and ethyl acetate indicate a sufficient spread in the respective boiling points of these compounds at the pressures contemplated, to render possible the separation of these chemicals, in anhydrous form, by means of ordinary vacuum distillation.

The process of my invention may be further illustrated by the following specific example wherein the improved efficiency thereof over dry vacuum distillation and wet distillation at atmospheric pressure is plainly demonstrated.

EXAMPLE

Three samples, two of which contained 414 ml. of butyraldehyde, 185 ml. of ethyl acetate, and 200 ml. of water, while the third sample consisted of 414 ml. of butyraldehyde and 185 ml. of ethyl acetate, were successively introduced into a highly efficient fractionating column under the conditions indicated below. At regular intervals, in each case, fractions of distillate were collected and analyzed.

TABLE I

Wet distillation at 120 mm.

| Cut No. | Overhead Temp., °C. | Overhead Vol.-ml. | | Analysis of Organic Layer | | | Wt. percent Butyraldehyde (Dry Basis) |
|---|---|---|---|---|---|---|---|
| | | Total | Organic Layer | Wt. percent Butyraldehyde | Wt. percent Ethyl Acetate | Wt. percent Water | |
| 1 | 24.2-24.5 | 76.0 | 50 | 96.4 | 1.1 | 2.5 | 98.9 |
| 2 | 24.4-24.7 | 72.5 | 50 | 89.8 | 4.9 | 5.3 | 94.8 |
| | (1) | 41.5 | 28.4 | | | | |
| 3 | 24.7-24.7 | 72.6 | 50.7 | 87.9 | 7.0 | 5.1 | 92.7 |
| 4 | 24.7-24.7 | 71.0 | 49.8 | 86.8 | 8.4 | 4.8 | 91.1 |

1 Collected in Dry Ice trap ahead of vacuum pump.

TABLE II

Wet distillation at atmospheric pressure

| Cut No. | Overhead Temp., °C. | Overhead Vol.-ml. | | Analysis of Organic Layer | | | Wt. percent Butyraldehyde (Dry Basis) |
|---|---|---|---|---|---|---|---|
| | | Total | Organic Layer | Wt. percent Butyraldehyde | Wt. percent Ethyl Acetate | Wt. percent Water | |
| 1 | 68.1-67.8 | 110.6 | 50.0 | 88.0 | 8.0 | 4.0 | 91.7 |
| 2 | 67.8-67.8 | 123.5 | 50.9 | 84.7 | 11.2 | 4.1 | 88.3 |
| 3 | 67.8-72.2 | 149.5 | 69.8 | 80.9 | 14.2 | 4.9 | 85.1 |
| 4¹ | 72.2-67.8 | 124.4 | 59.0 | 81.8 | 14.1 | 4.1 | 85.3 |
| 5 | 67.8-67.8 | 113.3 | 51.0 | 82.4 | 13.8 | 3.8 | 85.7 |

1 200 ml. of water added to the still before cut No. 4 was made.

TABLE III

Dry vacuum distillation

| Cut No. | Overhead Temp.,° C. | Volume, ml. | Pressure, mm. | Wt. Percent Butyraldehyde |
|---|---|---|---|---|
| 1 | 25.8-27.3 | 50.0 | 123 | 89.5 |
| 2 | 27.3-28.8 | 64.5 | 121 | 77.4 |
| 3 | 28.2-28.2 | 55.4 | 121 | 82.1 |
| 4 | 28.2-28.3 | 50.0 | 121 | 86.2 |
| 5 | 28.3-27.8 | 50.0 | 120 | 89.4 |
| 6 | 27.8-27.8 | 50.0 | 121 | 87.8 |

The true value of each of the procedures set forth in the above example can be ascertained when it is recognized that the best results obtained in each of the three individual processes represent the efficiency that is possible when operating on a continuous basis instead of a batchwise operation. Thus, when operating continuously in accordance with the present invention, butyraldehyde of 98.9 per cent purity can be obtained; however, when operating under the respective conditions specified by Tables II and III, butyraldehyde of only 91.7 per cent and 89.5 per cent purity can be produced.

It will be apparent in view of the foregoing description and data appearing above that the process of my invention may be modified in numerous ways without materially departing from the scope thereof. In general, it may be said that the use of any equivalents or modifications of procedure which would normally occur to one skilled in the art is to be included within the scope of my invention.

The expressions "wet butyraldehyde" and "wet ethyl acetate" herein referred to are to be interpreted as homogeneous quantities of butyraldehyde or ethyl acetate containing solubilized water. Also, unless otherwise specified, the pressure ranges given herein are intended to refer to the permissible pressures prevailing at or slightly below the point in the distillation column of overhead vapor withdrawal.

What I claim is:

1. In a process for separating butyraldehyde from an aqueous mixture of ethyl acetate, the steps which comprise subjecting a heterogeneous mixture of butyraldehyde and ethyl acetate containing water in a concentration of from about 9 to about 35 weight per cent to fractional distillation at pressures of from about 50 to about 250 mm. and collecting an overhead of butyraldehyde-water azeotrope and a bottoms fraction of ethyl acetate and water.

2. In a process for obtaining butyraldehyde in a substantially pure state from aqueous mixtures of oxygenated organic compounds of the type produced in the synthesis of hydrocarbons from carbon monoxide and hydrogen, said mixtures containing ethyl acetate and methyl ethyl ketone, the steps which comprise subjecting said mixture to fractional distillation in a column in which a heat input of from 80 to 120 B. t. u. per lb. of bottoms is employed to give a bottom tower temperature of from about 82° to about 94° C. (corrected to atmospheric pressure) and an overhead temperature of from about 68° to about 77° C., introducing water into said column in an amount such that the concentration of water in the liquid at any point in the column is from about 90 to about 99 mole per cent, withdrawing an overhead stream of butyraldehyde, water, and ethyl acetate, subjecting said overhead stream to fractional distillation at pressures of from about 50 to 250 mm. in the presence of from about 9 to about 35 weight per cent water, collecting a distillate of butyraldehyde-water azeotrope, recovering wet butyraldehyde therefrom, thereafter subjecting the wet butyraldehyde so recovered to a fractional distillation step at a pressure ranging from about atmospheric pressure to about 40 p. s. i. a., and withdrawing overhead a butyraldehyde-water azeotrope leaving a bottoms fraction of dry substantially pure butyraldehyde.

3. In a process for obtaining butyraldehyde in a substantially pure state from aqueous mixtures of oxygenated organic compounds of the type produced in the synthesis of hydrocarbons from carbon monoxide and hydrogen, said mixtures containing ethyl acetate and methyl ethyl ketone, the steps which comprise subjecting said mixture to fractional distillation in a column in which a heat input of from 80 to 120 B. t. u. per lb. of bottoms is employed to give a bottom tower temperature of from about 82° to about 94° C. (corrected to atmospheric pressure) and an overhead temperature of from about 68° to about 77° C., introducing water into said column in an amount such that the concentration of water in the liquid at any point in the column is from about 90 to about 99 mole per cent, withdrawing an overhead stream of butyraldehyde, water, and ethyl acetate, subjecting said overhead stream to fractional distillation at pressures of from about 50 to 250 mm. in the presence of from about 9 to about 35 weight per cent water, and collecting an overhead of butyraldehyde-water azeotrope and a bottoms fraction of ethyl acetate and water.

4. In a process for separating butyraldehyde from an aqueous mixture of ethyl acetate, the steps which comprise fractionally distilling a heterogeneous mixture of butyraldehyde and ethyl acetate containing not more than 50 weight per cent water but at least sufficient water to form the individual aqueous azeotropes of butyraldehyde and ethyl acetate at a pressure of between about 50 and about 250 mm. Hg and separating an overhead of butyraldehyde-water azeotrope from a residual fraction of ethyl acetate and water.

5. In a process for separating butyraldehyde from a mixture of the latter with ethyl acetate, the steps which comprise adjusting the water content of said mixture to a concentration of from about 9 to about 35 wt. per cent, thereafter subjecting the resulting mixture to fractional distillation at pressures of from about 50 to about 250 mm. and collecting an overhead of butyraldehyde-water azeotrope and a bottoms fraction of ethyl acetate and water.

6. In a process for separating butyraldehyde from a mixture containing the latter and ethyl acetate, the steps which comprise adjusting the water content of said mixture to a concentration corresponding to not more than 50 wt. per cent of said mixture but at least sufficient water to form the individual aqueous azeotropes of butyraldehyde and ethyl acetate, thereafter subjecting the resulting mixture to fractional distillation at a pressure of between about 50 and about 250 mm. and separating an overhead of butyraldehyde-water azeotrope from a residual fraction of ethyl acetate and water.

THEODORE Q. ELIOT.

References Cited in the file of this patent

UNITED STATES PATENTS

| Number | Name | Date |
|---|---|---|
| 1,556,067 | Bogin | Oct. 6, 1925 |
| 1,676,700 | Lewis | July 10, 1928 |
| 1,724,761 | Holden | Aug. 13, 1929 |
| 2,290,636 | Deanesly | July 21, 1942 |
| 2,321,748 | Hopkins et al. | June 15, 1943 |
| 2,324,255 | Britton et al. | July 13, 1943 |
| 2,398,689 | Bloomer | Apr. 16, 1946 |
| 2,454,447 | Harney, Jr., et al. | Nov. 23, 1948 |
| 2,476,391 | Stantzenberger et al. | July 19, 1949 |

OTHER REFERENCES

Young, "Distillation Principles and Processes," copyright 1922 by MacMillan and Co., Limited, London, pages 59–61. (Copy in Div. 25.)

Analytical Chemistry, vol. 19, page 510, August 1947, "Table of Azotropes and Nonazeotropes" compiled by L. H. Horsley. (Copy in Patent Office Library.)